United States Patent
Oriet et al.

(10) Patent No.: US 8,056,958 B2
(45) Date of Patent: Nov. 15, 2011

(54) SCHOOL BUS ROLLOVER PROTECTION STRUCTURE

(75) Inventors: Leo Oriet, Rochester Hills, MI (US); Andre Bocancea, Windsor (CA); Jules Cazabon, Staples (CA); Nouri Matar, Scarborough (CA); Blanca E Hernandez Villagomez, Windsor (CA)

(73) Assignee: Navistar Canada, Inc. (CA)

( * ) Notice: Subject to any disclaimer, the term of this patent is extended or adjusted under 35 U.S.C. 154(b) by 328 days.

(21) Appl. No.: 12/505,008

(22) Filed: Jul. 17, 2009

(65) Prior Publication Data

US 2011/0012332 A1 Jan. 20, 2011

(51) Int. Cl.
*B60R 21/13* (2006.01)

(52) U.S. Cl. .................................... 296/178; 296/187.01

(58) Field of Classification Search .................. 296/178, 296/187.13, 193.04, 193.05, 203.01, 203.02, 296/203.04, 205, 210

See application file for complete search history.

(56) References Cited

U.S. PATENT DOCUMENTS

| | | | |
|---|---|---|---|
| 4,059,303 A * | 11/1977 | Mauri | 296/203.01 |
| 4,221,426 A | 9/1980 | Wardill | |
| 4,283,086 A | 8/1981 | Morin | |
| 6,454,345 B1 | 9/2002 | Campus | |
| 6,502,895 B2 | 1/2003 | Taylor | |
| 6,685,254 B2 | 2/2004 | Emmons | |
| 7,097,232 B2 | 8/2006 | Beaudry | |
| 7,549,696 B1 * | 6/2009 | Timmermans et al. | 296/203.03 |
| 2006/0273624 A1 * | 12/2006 | Romano | 296/178 |

* cited by examiner

*Primary Examiner* — Dennis Pedder
*Assistant Examiner* — Jason S Daniels
(74) *Attorney, Agent, or Firm* — Jeffrey P. Calfa; Mark C. Bach

(57) ABSTRACT

A protection structure is formed from a platform and a forward pair and a rearward pair of load bearing members, where each load bearing member is attached at a lower end to the platform. A first and second pair of side beams are attached to the outer side of one of each of the pair of load bearing members, respectively. A pair of upper corner beams are attached to an upper end of each of the load bearing members and attached to an end of each of a forward pair and a rearward pair of transverse members, where a beam is attached to the opposite end of each of the pair of transverse members. Body panels may be attached to the protection structure to define and enclose the occupant compartment.

13 Claims, 4 Drawing Sheets

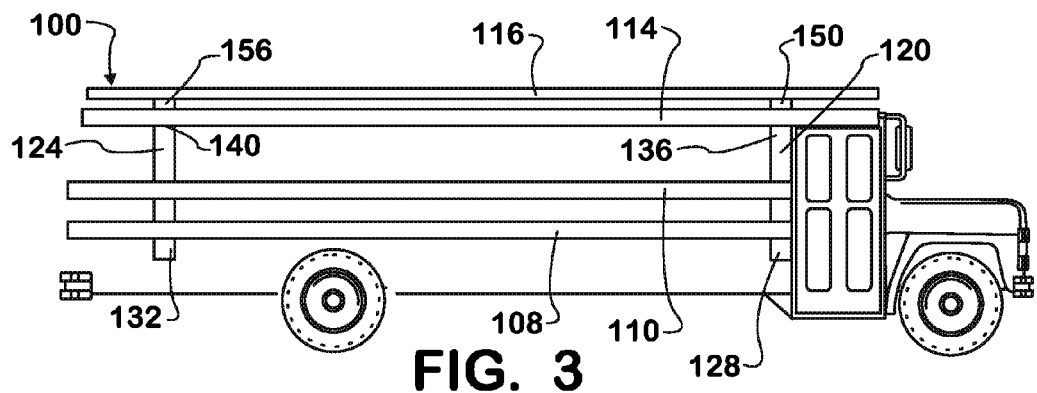
FIG. 3
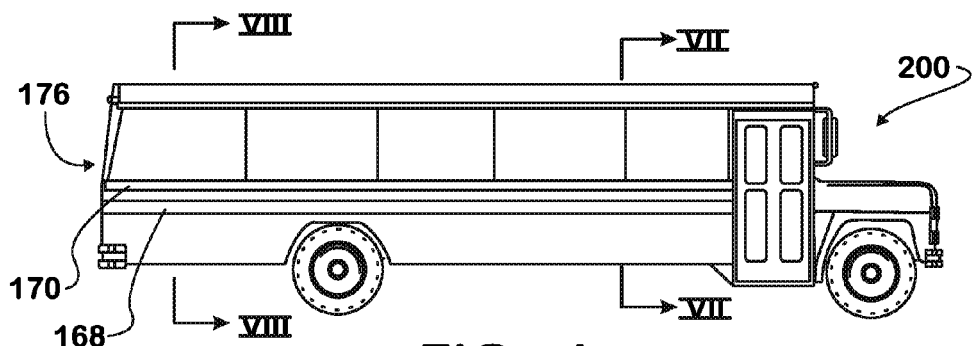
FIG. 4
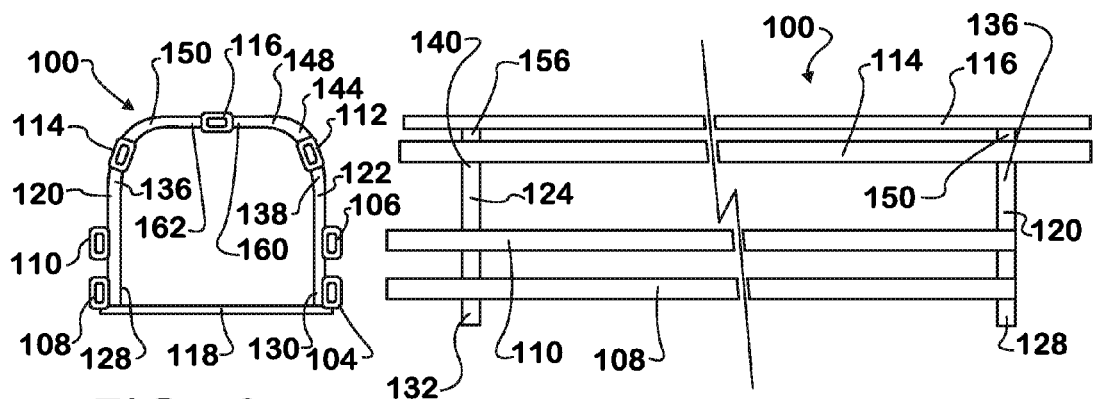
FIG. 6
FIG. 5

SCHOOL BUS ROLLOVER PROTECTION STRUCTURE

BACKGROUND

Embodiments disclosed herein relate to motor vehicle occupant compartment construction, and in particular to a school bus occupant rollover protective structure that reduces the risk of injuries in rollover accidents, simplifies construction, and reduces cost.

School bus rollovers are a type of vehicle accident, often resulting in injury, and efforts have been taken to provide improved rollover protection to the occupants, often schoolchildren. To this end, the United States Department of Transportation, through the National Highway Traffic and Safety Administration, has enacted several Federal Motor Vehicle Safety Standards ("FMVSS") directed to the improved performance of school buses in a rollover.

One such Standard is FMVSS 220—School Bus Body Rollover (Roof Crush). This Standard applies a force equal to 1½ times the unloaded weight of the bus to the roof of the bus. The downward vertical movement of the force application plate is not to exceed 130 mm (5.125 inches). The length of the force application plate is 305 mm (12 inches) less than the length of the bus roof and 915 mm (36 inches) wide. Each emergency exit of the bus must operate in accordance with FMVSS 217 before, during, and after a roof crush test.

Another Standard is FMVSS 221—School Bus Body Joint Strength. In this Standard, each body panel joint shall hold the body panel to the member to which it is joined when subjected to a force of 60% of the tensile strength of the weakest joined body panel. A body panel is defined as a body component used on the interior or exterior surface to enclose the passenger compartment. The passenger compartment is defined as space within the school bus interior that is between a vertical transverse plane located 762 mm (30 inches) in front of the forward most passenger seating reference point and including a vertical transverse plane tangent to the rear interior wall of the bus.

Additional standards have been established by other organizations, such as the National School Transportation Association, and in particular its Specifications & Procedures—Side Intrusion. Under this standard, the bus body must withstand an intrusion force equal to the curb weight of the bus, but shall not exceed 88,960 N (20,000 pounds), whichever is less. The side of the bus is impacted at a location 559 to 610 mm (22 to 24 inches) above the floor line, with a 254 mm (10 inch) maximum diameter cylinder, 1,219 mm (48 inches) long in a horizontal plane. The cylinder must span two internal vertical structural members (bows). The cylinder shall not exceed 254 mm (10 inches) from its original point of contact. There can be no separation of lapped panels or construction joints.

Other standards include those of the State of Kentucky, Minimum Specifications for School Buses—Roof Intrusion. In this standard, there shall be no separation of a lapped panel joint when impacted at any point along the roof line on the outside surface, using an 203 mm (8 inch) diameter cylinder, 1,219 mm (48 inches) long, at a 30-45-degree angle, 25.4 to 76.3 mm (1 to 3 inches) above the top window line. The cylinder shall impact the roof line with the 1,219 mm (48 inch) dimension in a vertical plane with a force not to exceed 254 mm (10 inches) penetration into the passenger compartment.

The State of Colorado has adopted a Racking Test, in which a diagonal (racking) load test is applied to Type A, B, C, D school buses to assure adequate shear stiffness and strength of the bus body. With a force equal to 1½ times the Gross Vehicle Weight applied to the edge of the roof, the diagonal movement of the force at any point on the force application plate must not exceed 130 mm (5.125 inches), and each emergency exit shall operate in accordance with FMVSS 217 before, during and after the racking test. This loading is to be performed twice (two-cycle loading sequence). Seats may be installed in the test body in a manner that is identical to normal production.

Attempts to comply with these standards has resulted in the development of school bus fuselages with a multiplicity of generally U-shaped, one-piece rib members, spaced at intervals along the length of the body and coupled adjacent to their ends to the bus floor in an inverted position. These rib members were located between the interior and exterior panels and are joined to all of the panels. A plurality of stringer members, located along the joints between the exterior roof panels and the interior roof panels, define elongated roof stringers that extend substantially the entire length of the bus body and are secured to substantially every rib member. The rib members, stringer members, and elongated panels have been effective in increasing the safety of passengers in the bus body in the event of a collision or upset.

The problem with this current industry wide school bus design is that although most school bus fuselages pass these static tests, the tests are not necessarily predictive of the performance of the vehicle in actual dynamic rollover accidents. For example, in testing under FMVSS 220—School Bus Body Rollover (Roof Crush), the test performed by progressively loading the roof structure does not duplicate the multi-directional forces applied simultaneously to the roof structure in an actual dynamic rollover accident. In recent actual rollover accidents, the roof structure above the lower side glass sill has completely collapsed during the dynamic rollover event, even though the school bus design complied with FMVSS 220. Thus, it has been determined that current school bus designs should be improved to improve rollover protection to the occupants.

SUMMARY

Embodiments disclosed herein relate to a bus rollover protection structure. In one embodiment, a school bus rollover protection structure is formed from a vehicle support platform and a forward pair and a rearward pair of vertically extending load bearing members where each vertically extending load bearing member is attached at a lower end to the vehicle support platform. First and second pairs of longitudinally extending side beams are attached to the outer side of one of each of the pair of vertically extending load bearing members, respectively. A pair of upper corner longitudinally extending beams are attached to an upper end of each of the vertically extending load bearing members and attached to an end of each of a forward pair and a rearward pair of transverse load bearing members, where a center upper longitudinally extending beam is attached to an opposite end of each of the pair of transverse load bearing members. Non-structural body panels may be attached to the school bus rollover protection structure to define an occupant compartment.

BRIEF DESCRIPTION OF THE DRAWINGS

FIG. 3 shows a cut-away side view of a school bus incorporating an embodiment of school bus rollover protection structure;

FIG. 4 shows an outside side view of a second school bus incorporating an embodiment of school bus rollover protection structure;

FIG. 5 shows a side view of an embodiment of school bus rollover protection structure;

FIG. 6 shows a front end view of an embodiment of school bus rollover protection structure;

DETAILED DESCRIPTION

Figure 1:
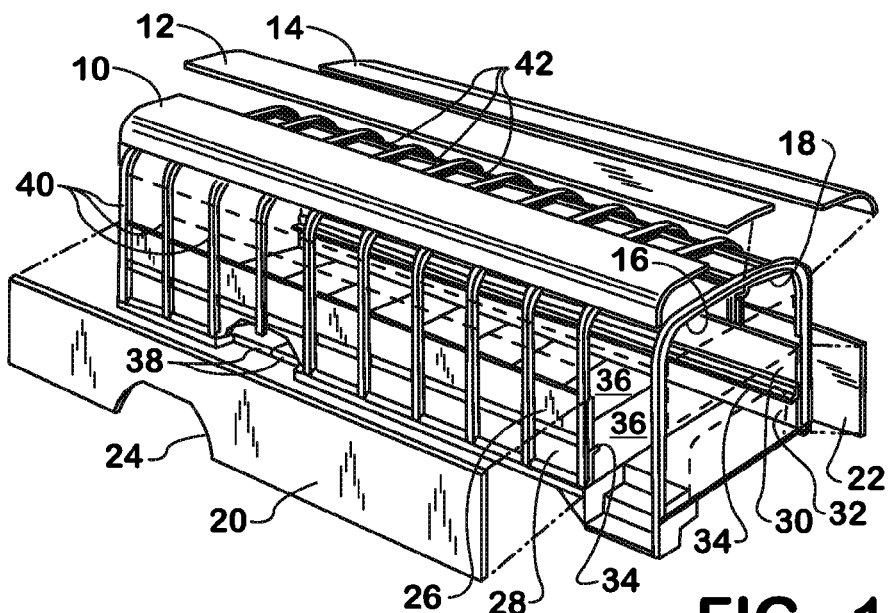
FIG. 1 shows a perspective view of a school bus of the prior art.

As noted above, prior attempts to comply with these standards has resulted in the development of school bus fuselages with a multiplicity of generally U-shaped, one-piece rib members, spaced at intervals along the length of the body and coupled adjacent to their ends to the bus floor in an inverted position, such as disclosed in U.S. Pat. No. 3,881,765. As shown in FIG. 1, the rib members are located between the interior and exterior panels and are joined to all of the panels. Three elongated, one-piece exterior roof panels 10, 12, and 14 extend the entire length of the bus body and define an exterior body roof. The central or medial panel 12 is substantially flat and its edges externally overlap the edges of the marginal roof panels 10 and 14 (see FIG. 3). The marginal panels 10 and 14 are pre-bent laterally to match the roof contour and facilitate the union of the roof to the sides of the bus body. The roof structure also includes two elongated, one-piece interior roof panels 16 and 18 that extend the length of the bus body, although shorter panels are disclosed.

The two exterior side walls of the bus body include two elongated, one-piece exterior side panels 20 and 22, one on either side, extending the entire length of the body. Each of the panels 20 and 22 has a wheel opening 24. One-piece guard rails (not shown) are fastened to the panels 20 and 22 at vertically spaced intervals for additional strength in the event of a side collision. Inside, four elongated one piece interior side panels extend the length of the body and define the interior body walls. Each interior wall of the body comprises a lower interior panel 28 (or 32) and an upper interior panel 26 (or 30). The lower panels 28 and 32 have integral, inwardly turned flanges 34 adjacent their upper edges just below the point where they meet the upper side panels 26 and 30. The flanges 34 support the outboard end of each seat (not shown) and eliminate the necessity for a separate bracket or outboard legs. The exterior side panels 20 and 22 are separated by the body ribs from the interior view panels 26, 28, 30 and 32 over most of their respective heights, but the lower portions of the lower interior side panels 28 and 32 are bent out and then down adjacent the floor of the bus body, the lower portions of the respective exterior and interior panels abutting. The upper and lower edges of the upper interior side panels 26 and 30 are doubled over for increased strength and to eliminate sharp edges on the inside walls, and the lower edges of the upper interior side panels 26 and 30 also overlap the upper edges of the lower interior side panels 28 and 32.

The floor of the body is composed of a plurality of generally identical rectangular floor panels 36, each of which extends transversely entirely across the body. Each floor panel 36 has an integral flange 38 that projects perpendicularly from the entire periphery of the panel 36. The flanges 38 permit the floor panels 36 conveniently to be fastened together and, further, permit the exterior side panels 20 and 22 and the interior side panels 26, 38, 30 and 32 to be fastened to the floor panels 36.

A multiplicity of U-shaped, one-piece ribs 40, spaced at equal intervals along the length of the body, are coupled adjacent their ends to the floor of the bus body in an inverted position. As shown, the ribs 40 are secured to the lower portions of panels 28 and 32, which are, in turn, secured to the floor panels 36. The ribs 40 are located between the exterior panels 10, 12, 14, 20 and 22 and the interior panels 16, 18, 26, 28, 30 and 32 and are joined to all of the panels.

To further strengthen the roof, a plurality of longitudinal stringer members 42 are located along the joints between the exterior roof panels 10, 12 and 14 and the joint between the interior roof panels 16 and 18, each member extending between each adjacent pair of ribs,. The aligned stringer member 42 together form elongated roof stringers that extend the entire length of the bus body and are secured to every rib 40.

Thus, a plurality of stringer members, located along the joints between the exterior roof panels and the joints between the interior roof panels, define elongated roof stringers that extends substantially the entire length of the bus body and are secured to substantially every rib member. The rib members, stringer members, and elongated panels afford a number of body joints and present a number of member and panel edges, over which, although being an improvement in increasing the safety of passengers in the bus body in the event of a collision or an upset, improvements are sought. That is, the panels of the prior art were not able to structurally to resist dynamic rollover stresses to which such panels are exposed. Yet in many present school bus bodies, the side and roof panels are depended upon almost entirely to resist the many stresses generated in the fuselage.

The main features of the of the school bus rollover protection structure 100 of the present disclosure include full structural rollover protection structure attached to the chassis frame rails 102 that include seven more or less longitudinal beams 104, 106, 107, 110, 112, 114 and 116. The longitudinal beams 104, 106, 107, 110, 112, 114 and 116 have a tubular construction manufactured in accordance with well known methods. A vehicle support platform 118 is directly attached to the chassis frame rails 102 and may advantageously be used to form the floor of the occupant compartment of the school bus.

A forward pair of vertically extending load bearing members 120, 122 and a rearward pair of vertically extending load bearing members 124, 126 are attached at a lower end 128, 130, 132 and 134, respectively, to the vehicle support platform 118. The first and second pair of longitudinally extending side beams 104, 106, 108, and 110 are attached to one each of the pair of vertically extending load bearing members 120, 122, 124 and 126, respectively, to an outer side edge of the extending load bearing members 120, 122, 124 and 126 as shown.

The pair of upper corner longitudinally extending beams 112 and 114 are attached to an upper end 136, 138, 140 and 142 of each of the vertically extending load bearing members 120, 122, 124 and 126, respectively, and is attached to a first distal end 144, 146 of each of a forward pair of transverse load bearing members 148, 150, respectively, and a first distal end 152, 154 of each of rearward pair of transverse load bearing members 156, 158, respectively. A center upper longitudinally extending beam 116 is attached to a second distal end 160, 162 of each of the forward pair of transverse load bearing members 148, 150, respectively, and to a second distal end 164, 166 of each of the rearward pair of transverse load bearing members 156, 158, respectively, to complete the rollover protection structure 100 and structurally enclose the occupant compartment. The first and a second pair of vertically extending load bearing members 120, 122, 124, 126 are attached proximate each of the corners of the substantially planar rectangular vehicle support platform 118.

In order to provide rollover protection to the school bus driver and passengers boarding or exiting the school bus, the pair of upper corner longitudinally extending beams 112 and 114 and the center upper longitudinally extending beam 116 extend forward beyond the first and second pair of longitudinally extending side beams 110, 112, 114, 116 to extend the rollover protection structure over the school bus driver seating position and side door position.

As shown, the pair of longitudinally extending side beams 106, 108, 110, 112 are parallel with and spaced apart one from the other to provide greater rigidity of the rollover protection structure. The lower one of the pair of longitudinally extending side beams 104 and 108 are parallel with and attached to the side edges of the vehicle support structure 118. The pair of longitudinally extending side beams create and define rub rails 168, 170, 172, 174 for the exterior surface of the school bus, thus eliminating the need for a additional structure to perform this function.

The rearward ends of the each of the first and second pair of longitudinally extending tubular beams 106, 108, 110, 112 of the disclosed school bus rollover protection structure 100 extend rearward beyond the rearward end of each of the corner longitudinally extending tubular beams 112, 114, thus providing a slope to the rear end 176 of the school bus 200 and encouraging drainage of rain and snow. Similarly, the rearward ends of the each of the first and second pair of longitudinally extending tubular beams 106, 108, 110, 112 and each of the corner longitudinally extending tubular beams 112, 114 extend rearward beyond the rearward end of the center upper longitudinally extending tubular beam 116 for the same effect.

Figure 7:
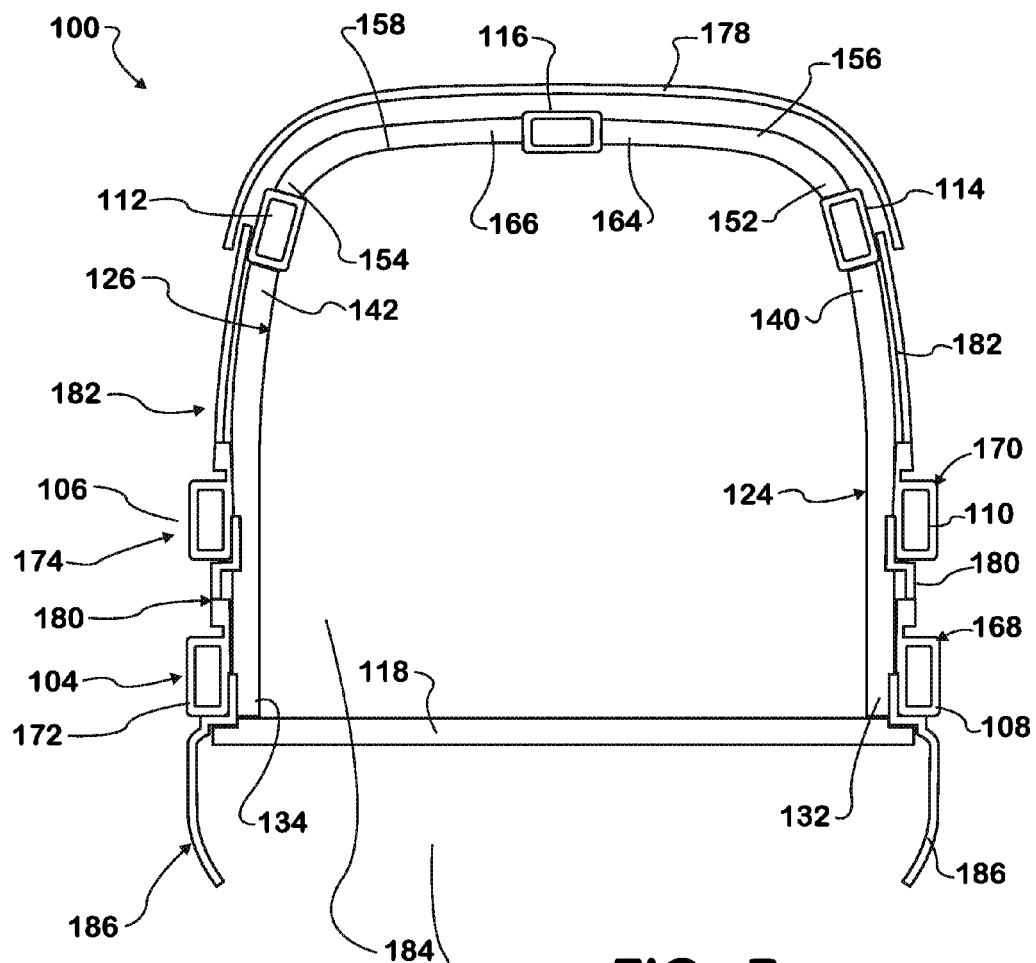
FIG. 7 shows an rear end sectional view of an embodiment of school bus rollover protection structure to which body and glass panels are attached taken along the line VII-VII in FIG. 4.
Figure 8:
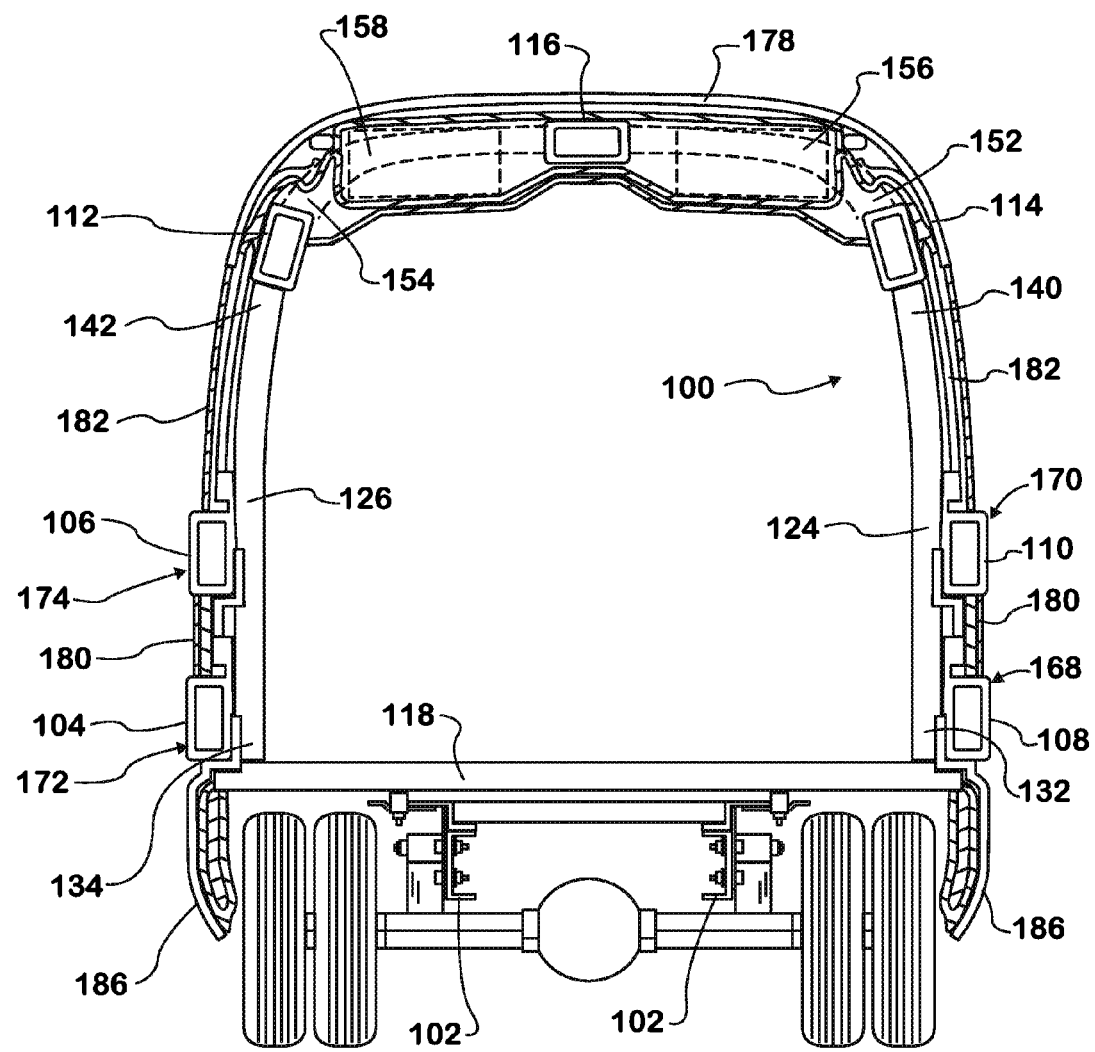
FIG. 8 shows a cross-sectional rear end sectional view of a school bus incorporating an embodiment of school bus rollover protection structure taken along the line VIII-VIII in FIG. 4.

A particularly advantageous benefit of the disclosed school bus rollover protection structure 100 includes the ability to attach non-structural roof panels 178, side panels 180 and glass panels 182 directly to the protection structure 100 to define and enclose an occupant compartment 184. The roof panels 178, side panels 180 and glass panels 182 can be attached to the various components of the protection structure 100 so as to overlap one another to form a shingled configuration, as shown in FIGS. 7 and 8. For example, the corner longitudinally extending tubular beams 112, 114 provides a bonding surface for urethane bonded side glass panels 182. This structure eliminates the water leak warrantee issues of prior structures. A skirt panel 186 is directly attached to the lower one of the pair of longitudinally extending side beams on each side.

The school bus rollover protection structure 100 permits the use of non structural roof panels 178 and side panels 180. Similarly, the school bus rollover protection structure 100 contributes to ease of serviceability by improving the ease to replace damaged side panels 180. Light weight panels have many advantages in that they produce a quiet body, may be molded into exact sizes, may be formed economically from plastics or composites, and may be readily replaced in case of accident or damage, and result in lighter construction. When bonded to the rollover protection structure, the panels may be assembled with substantial labor savings.

The school bus rollover protection structure 100 of the present disclosure is thus a simpler structure composed of at least two structural protection hoops with at least four mounting points to the vehicle substructure to protect the occupants in the case of a rollover accident. Added benefits include chassis stiffening and the ability place to mount the student seats, roof, side sheet mount and other structures to the school bus rollover protection structure of the present disclosure 100.

Figure 2:
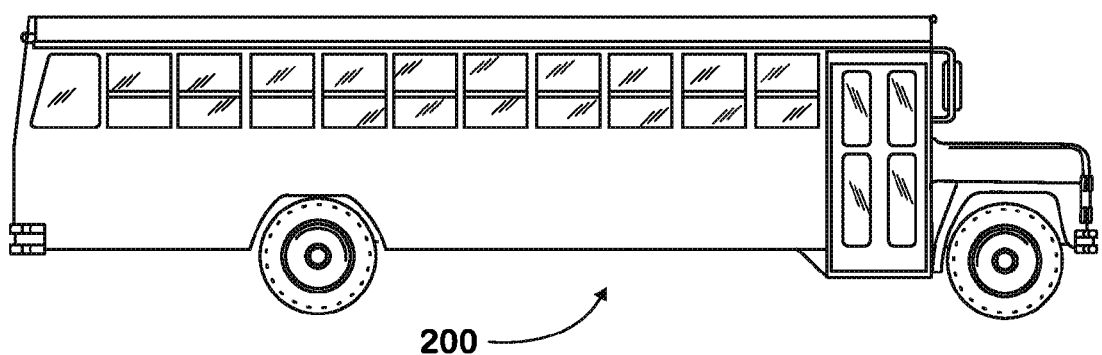
FIG. 2 shows an outside side view of a school bus incorporating an embodiment of school bus rollover protection structure.

The school bus rollover protection structure 100 of the present disclosure, as shown in FIGS. 3, 5, 6 and 7, is readily applied to existing vehicle platforms. FIG. 2 shows an outside view of a typical existing school bus that may incorporate the disclosed rollover protection structure. However, other designs are contemplated to which the disclosed rollover protection structure can be applied, as shown in FIGS. 4, 7 and 8, where the roof, exterior panels and the side glass attached directly to the rollover protection structure, thereby eliminating the need and costs of redundant body structure. These beams completely replace the conventional U-shaped, one-piece rib members spaced at intervals along the length of the body and coupled adjacent to their ends to the bus floor in an inverted position. These beams are located between the interior and exterior panels and all of the panels are joined to the beams as illustrated in FIG. 7.

The school bus rollover protection structure 100 therefore serves multiple purposes. The benefits of adding a full cage includes even more chassis stiffening, even more protection (including side impact protection), FMVSS compliance, and a place to bond the roof, side glass and sheets. Reduction in manual assembly labor is expect to be 50% more or less, while reduction of the school bus body fuselage part complexity is expected to be 50% more or less. It creates a protective zone around the driver and the schoolchildren when a rollover occurs, which will resist actual dynamic rollover stresses.

What is claimed is:

1. A school bus rollover protection structure comprising:
a vehicle support platform;
a forward pair of vertically extending load bearing members and a rearward pair of vertically extending load bearing members, each of both the forward pair of vertically extending load bearing members and the rearward pair of vertically extending load bearing members being attached at a lower end to the vehicle support platform;
a first pair of longitudinally extending side beams attached to one of the forward pair of vertically extending load bearing members and the rearward pair of vertically extending load bearing members, and a second pair of longitudinally extending side beams attached to another one of the forward pair of vertically extending load bearing members and the rearward pair of vertically extending load bearing members;
a forward pair of transverse load bearing members and a rearward pair of transverse load bearing members;
a pair of upper corner longitudinally extending beams attached to an upper end of each of the forward pair of vertically extending load bearing members and the rearward pair of vertically extending load bearing members, and attached to a first distal end of each of the forward pair of transverse load bearing members and the rearward pair of transverse load bearing members; and
a center upper longitudinally extending beam attached to a second distal end of each of the forward pair of transverse load bearing members and the rearward pair of transverse load bearing members wherein rearward ends of each of the pair of upper corner longitudinally extending beams extends rearward beyond a rearward end the center upper longitudinally extending beam.

2. The school bus rollover protection structure as set forth in claim 1, wherein the first pair of longitudinally extending side beams, the second pair of longitudinally extending side beams, the pair of upper corner longitudinally extending beams and the center upper longitudinally extending beam have a tubular construction.

3. The school bus rollover protection structure as set forth in claim 2, further comprising:
a skirt panel is attached to the lower one of the pair of longitudinally extending side beams.

4. The school bus rollover protection structure as set forth in claim 1, wherein the pair of upper corner longitudinally extending beams and a portion of the center upper longitudinally extending beam extend beyond the first pair of longitudinally extending side beams and the second pair of longitudinally extending side beams.

5. The school bus rollover protection structure as set forth in claim 1, wherein a lower one of the first pair of longitudinally extending side beams and the second pair of longitudinally extending side beams is parallel with and is attached to side edges of the vehicle support structure.

6. The school bus rollover protection structure as set forth in claim 1, wherein each pair of the first pair of longitudinally extending side beams and the second pair of longitudinally extending side beams is parallel with and is spaced apart one from each other.

7. The school bus rollover protection structure as set forth in claim 1, wherein an outer side of each of the first pair of longitudinally extending side beams and the second pair of longitudinally extending side beams define rub rails for an exterior surface of the school bus.

8. The school bus rollover protection structure as set forth in claim 1, wherein each of the first pair of longitudinally extending side beams and the second pair of longitudinally extending side beams is attached to an outer side of the forward pair of vertically extending load bearing members or a rearward pair of vertically extending load bearing members.

9. The school bus rollover protection structure as set forth in claim 1, wherein rearward ends of each of the first pair of longitudinally extending side beams and the second pair of longitudinally extending side beams extends rearward beyond a rearward end of each of the center upper longitudinally extending beam and the pair of upper corner longitudinally extending beams.

10. The school bus rollover protection structure as set forth in claim 1, further comprising:
non-structural roof panels, side panels, and glass panels are attached to the school bus rollover protection structure to define and enclose an occupant compartment.

11. The school bus rollover protection structure as set forth in claim 10, wherein the roof panels, side panels, and glass panels overlap each other to form a shingled configuration.

12. A school bus rollover protection structure comprising:
a substantially planar elongated vehicle support platform having parallel side edges;
a forward pair of vertically extending load bearing members and a rearward pair of vertically extending load bearing members, a lower end of each of the forward pair of vertically extending load bearing members and the rearward pair of vertically extending load bearing members attached to the substantially planar elongated vehicle support platform proximate side edges of the substantially planar elongated vehicle support platform;
a first pair of upper and lower longitudinally extending parallel spaced apart tubular side beams attached to an outer side of one of the forward pair of vertically extending load bearing members and the rearward pair of vertically extending load bearing members;
a second pair of upper and lower longitudinally extending parallel spaced apart tubular side beams attached to an outer side of another one of the forward pair of vertically extending load bearing members and the rearward pair of vertically extending load bearing members;
a lower one of the pair of upper and lower longitudinally extending parallel spaced apart tubular side beams being parallel with and attached to the parallel side edges of the substantially planar elongated vehicle support platform;
a forward pair of transverse load bearing members and a rearward pair of transverse load bearing members;
a pair of upper corner longitudinally extending parallel tubular beams attached to an upper end of each of the vertically extending load bearing members and attached to a first distal end of each of the transverse load bearing members, the forward end of each of the corner longitudinally extending tubular beams extending forward beyond a forward end of the each of the first and second pair of longitudinally extending tubular beams and the rearward ends of the each of the first and second pair of longitudinally extending tubular beams extending rearward beyond a rearward end of each of the corner longitudinally extending tubular beams;
a center upper longitudinally extending tubular beam attached to a second distal end of each of the pair of transverse load bearing members, a forward end of the center upper longitudinally extending tubular beam extending forward beyond the forward end of the each of the first and second pair of longitudinally extending tubular beams and a rearward end of the each of the first and second pair of longitudinally extending tubular beams and each of the corner longitudinally extending tubular beams extending rearward beyond the rearward end of the center upper longitudinally extending tubular beam.

13. The school bus rollover protection structure as set forth in claim 12, further comprising:
non-structural roof panels, side panels, and glass panels attached to the school bus rollover protection structure in an overlapped configuration to define an occupant compartment.

* * * * *